(12) United States Patent
Morrison et al.

(10) Patent No.: US 12,271,018 B2
(45) Date of Patent: Apr. 8, 2025

(54) LIGHT INDICATOR FOR USER INPUT DEVICE

(71) Applicant: Dell Products L.P., Round Rock, TX (US)

(72) Inventors: Jason Scott Morrison, Chadron, NE (US); Yi-Ming Chou, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/149,889

(22) Filed: Jan. 4, 2023

(65) Prior Publication Data

US 2024/0219621 A1 Jul. 4, 2024

(51) Int. Cl.
*F21V 8/00* (2006.01)
*A63F 13/24* (2014.01)

(52) U.S. Cl.
CPC ............ *G02B 6/0045* (2013.01); *A63F 13/24* (2014.09); *G02B 6/005* (2013.01); *G02B 6/0065* (2013.01); *G02B 6/0073* (2013.01); *G02B 6/0095* (2013.01)

(58) Field of Classification Search
CPC .... G02B 6/0045; G02B 6/005; G02B 6/0065; G02B 6/0073; G02B 6/0095; A63F 13/24
See application file for complete search history.

(56) References Cited

U.S. PATENT DOCUMENTS

| | | | |
|---|---|---|---|
| 6,104,857 A * | 8/2000 | Ishiharada | G02B 6/02033 385/141 |
| 2015/0362658 A1* | 12/2015 | Lee | G02B 6/0095 362/23.05 |
| 2021/0197079 A1* | 7/2021 | Seibert | A63F 13/327 |

* cited by examiner

*Primary Examiner* — Donald L Raleigh
(74) *Attorney, Agent, or Firm* — Norton Rose Fulbright US LLP

(57) ABSTRACT

Embodiments of this disclosure provide a user input device, such as a gaming controller, for providing input to the information handling system while executing the applications. The user input device may include a three-dimensional lighting structure, which bends across many faces or surfaces of the user input device while providing a uniform light emission. The lighting structure may be used to convey an instruction to a user, such as a direction to turn the device, convey information to the user, such as flashing to indicate a notification, and/or used to convey application feedback, such as flashing or changing lights based on events occurring in the application.

20 Claims, 5 Drawing Sheets

LIGHT INDICATOR FOR USER INPUT DEVICE

FIELD OF THE DISCLOSURE

The instant disclosure relates to information handling systems. More specifically, portions of this disclosure relate to user input devices for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Information handling systems may be used to execute applications such as gaming applications. Aspects of embodiments of this disclosure provide a user input device, such as a gaming controller, for providing input to the information handling system while executing the applications. The user input device may include a three-dimensional lighting structure, which bends across many faces or surfaces of the user input device while providing a uniform light emission. The lighting structure may be used to convey an instruction to a user, such as a direction to turn the device, convey information to the user, such as flashing to indicate a notification, and/or used to convey application feedback, such as flashing or changing lights based on events occurring in the application.

Certain aspects of embodiments in this disclosure use a few methods to optimize the light guide design for the small form factor to provide acceptable diffusions. For example, light emitting diodes (LEDs) may be configured to fire away from the viewing side of the lightguide. Further, masking may be used to block the direct light path to the viewing side facing a user. As another example, dispersive media may be used throughout the lightguide material and/or reflective material may be used on a far side of the lightguide. The three-dimensional curve shape of the light guide may be obtained using two custom LED-based flexible printed circuits (FPCs) that, when folded in a two-dimensional shape, follow a three-dimensional curve, which may follow a contour of a case of the user input device. The user input device in an environment with game applications and other media consumption may be used to interact with the user by receiving user input to control execution of an application and the display of the application on various devices.

In some embodiments, the aspects described herein may be used to support the execution of gaming applications in different environments. Gaming sessions may execute on a service, either locally on a device, on another system on the network, or in the cloud. A device may access the gaming session by executing an application that communicates with the service to receive and transmit user input to the service and provide feedback to the user from the service. The device may include its own audio/visual (AV) output for displaying a graphical user interface and/or a rendered display from the gaming session. Different environments at a location may include different AV systems, and the device may be automatically paired with an AV system and may be reconfigured to support interaction with an application session using the paired AV system.

A user's home is one example location that may have multiple environments, such as a living room, a dining room, a study, and/or a bedroom, each with different screen configurations, speaker configurations, and/or network availability. Aspects of embodiments disclosed herein may provide a system that enables game play from a set of candidate game hosts and environments to consumption devices of a user's choice while the user moves about their home between the different environments. The system may employ methods to determine where a user is located within the home, availability and selection of candidate game hosting and target environments, homing and direction of related I/O, and/or AV for consumption. The system then migrates the user and their information to the determined environment by coordinating gameplay by the user. The solution accommodates multiple users simultaneously within the home, whether in single player, multiplayer using the same screen, or multiplayer using separate screen games. The solution may configure AV and input/output (I/O) such that multiple users can consume one or multiple games in the home simultaneously, whether in separate locations or when seated together in front of the same consumption device, e.g., a large television, where multiple games might be hosted simultaneously.

According to one embodiment, an apparatus, such as a user input device or gaming controller, may include a case enclosing a space for user input device components; a lightguide comprising a first surface exposed through the case and a second surface concealed inside the case; and a lighting device within the case configured to emit light into the second surface of the lightguide for output through the first surface.

In certain embodiments, a method of assembling a user input device may include bending a first flexible printed circuit to form a first portion of a three-dimensional light shape; bending a second flexible printed circuit to form a second portion of the three-dimensional light shape; and attaching the first portion to the second portion to complete the three-dimensional light shape. The first portion and the second portion may include: a lightguide comprising a first surface exposed through the case and a second surface concealed inside the case; and a lighting device configured to emit light into the second surface of the lightguide for output through the first surface.

As used herein, the term "coupled" or "attached" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

These example embodiments describe and illustrate various aspects of a configurable and dynamic gaming environment that can be supported through the use of a hub device, which may be an information handling system. A hub device may be located in a user's home and used to arrange game play sessions (or more generically application sessions) between host devices and services. The host devices may execute an application for receiving an AV stream for displaying rendered content from a game play session (or other application session), and in some configurations also receive user input for interacting with the session from a peripheral device, such as a user input device or a gaming controller. The AV stream presented by the host device may be generated by a service. The service may execute on the hub device or another information handling system, such as a cloud computing resource. A home may include one or several host devices (e.g., televisions, mobile computers, tablet computers, and personal computers) and may include one or several information handling systems executing the service (e.g., a hub devices and personal computers).

Figure 1:
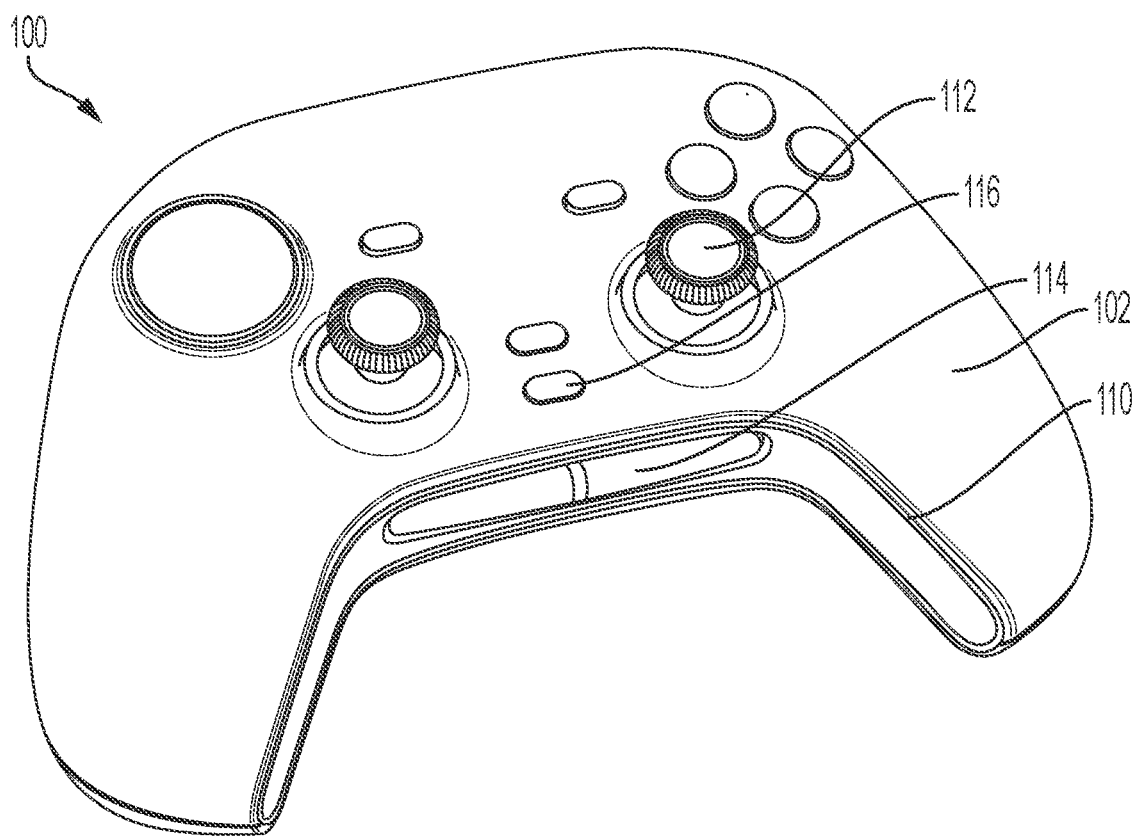
FIG. 1 is a perspective view of a user input device with a lighting element according to some embodiments of the disclosure.

FIG. 1 is a perspective view of a user input device with a lighting element according to some embodiments of the disclosure. A user input device 100, such as a gaming controller, may have a casing 102 with input components such as joysticks 112 and buttons 114 and 116 on various surface of the casing 102. The casing 102 may enclose a space for user input device components. A lighting element 110 may extend across several faces of the casing 102, such that the lighting element 110 is curved in a three-dimensional structure. The lighting element 110 may include a plurality of lights, such as light emitting diodes (LEDs), to provide variable color lighting. For example, the lighting element 110 may be able to provide addressable red-green-blue (RGB) lighting to display feedback to a user when operating the user input device 100 and/or provide in-game effects to the user when operating the user input device 100 in a gaming application.

The lighting element 110 may be configured to increase a light diffusion path distance using compact lightguides to provide three-dimensional curved lighting using a reduced amount of space in the casing 102. In some aspects, the lighting element 110 may have one or more of: light emitting diodes (LEDs) configured to fire away from a viewing side of the lighting element 110; shielding or masking to block the direct light path from the LEDs to the viewing side (or user-facing side) of the lighting element 110; dispersive media present in part or throughout the lightguide material of lighting element 110; and/or reflective material present on a far side of the lightguide material of lighting element 110. The illustrated portion of lighting element 110 visible as part of the casing 102 is a visible part of a lightguide that extends into the casing 102, with the LEDs contained within the casing 102.

Figure 2:
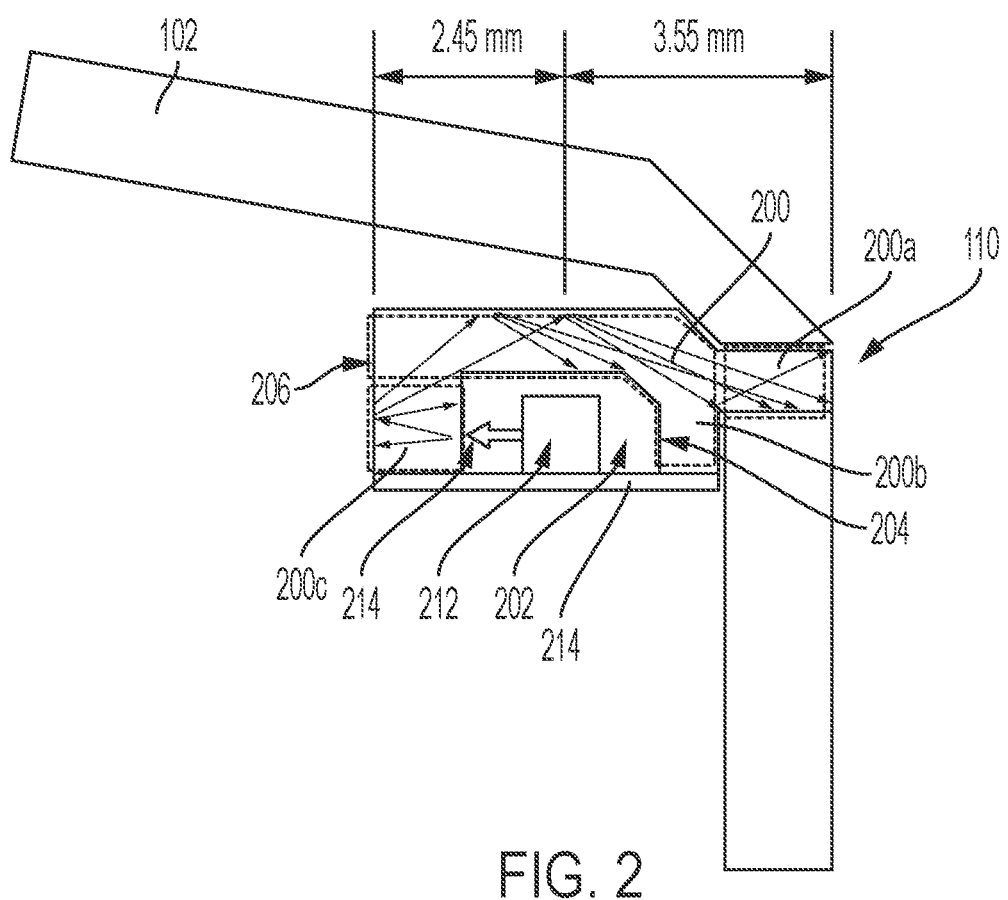
FIG. 2 is a cross-sectional view of a portion of a user input device with a back-firing lighting element according to some embodiments of the disclosure.

An example configuration for a lightguide for use in user input device 100 is shown in FIG. 2. FIG. 2 is a cross-sectional view of a portion of a user input device with a back-firing lighting element according to some embodiments of the disclosure. A casing 102 wraps around a portion of lightguide 200, leaving a visible part 110 of the lightguide 200 facing away from the casing 102. The lightguide 200 may include several portions 200a, 200b, and 200c. A first portion 200a may allow light to exit a portion 200b of the lightguide 200 to display an effect on the casing 102. A second portion 200b may optically couple the first portion 200a to a third portion 200c. The third portion 200c may receive light emitted from a lighting device 212, such as a light-emitting diode (LED).

The lighting device 212 may be backward-firing, such that light emitted from the lighting device 212 is directed away from the visible part 110 of the lightguide 200. In some embodiments, the lighting device 212 may be omnidirectional and light from directions other than for entering the third portion 200c reflected toward the third portion 200c. A mask 204 may coat one or more surfaces of the second portion 200b facing toward the lighting device 202 to reduce or block light transmission from the lighting device 212 directly toward the visible part 110 of the lightguide 200 through the second portion 200b and first portion 200a. The lighting device 212 may be present inside a cavity 202 created by the lightguide 200 and a circuit board 214 to which the lighting device 212 is attached.

Light emitted from the visible part 110 of the lightguide 200 is primarily (e.g., >90%, >95%, >96%, >97%, >98%, or >99%) indirect light from the lighting device 212. The light may enter the third portion 200c. A reflective paint 206 on a surface of the lightguide 200 opposite the lighting device 212 from the visible part 110. Light entering the third portion 200c reflects into the second portion 200b, in which the light travels and reaches the first part 200a for emission from the visible part 110 of the lightguide 200. The lightguide 200 is configured such that light emitted from a first surface at the visible part 110 of the lightguide 200 originated from light entering a second surface from the lighting device 212 and reflecting off a third surface with reflective paint 206.

The user input device 100 may include multiple of the structures shown in FIG. 2, in which the cumulative visible parts form a three-dimensional curved structure. In some embodiments, the circuit board 214 may be a flexible printed circuit (FPC) and couple to multiple lighting devices 212. In some embodiments, the circuit board 214 may be attached to one lighting device 212, and multiple circuit boards coupled together. A controller may be coupled to the lighting devices through the one or many circuit board. The controller may control an intensity and/or a color of the lighting devices. In some embodiments, the controller may control all lighting devices as a single color or intensity. In some embodiments, the controller may individually address each lighting device to provide color motion effects. The controller may receive instructions for displaying certain lighting effects or patterns through a wired or wireless interface to an information handling system.

Figure 3:
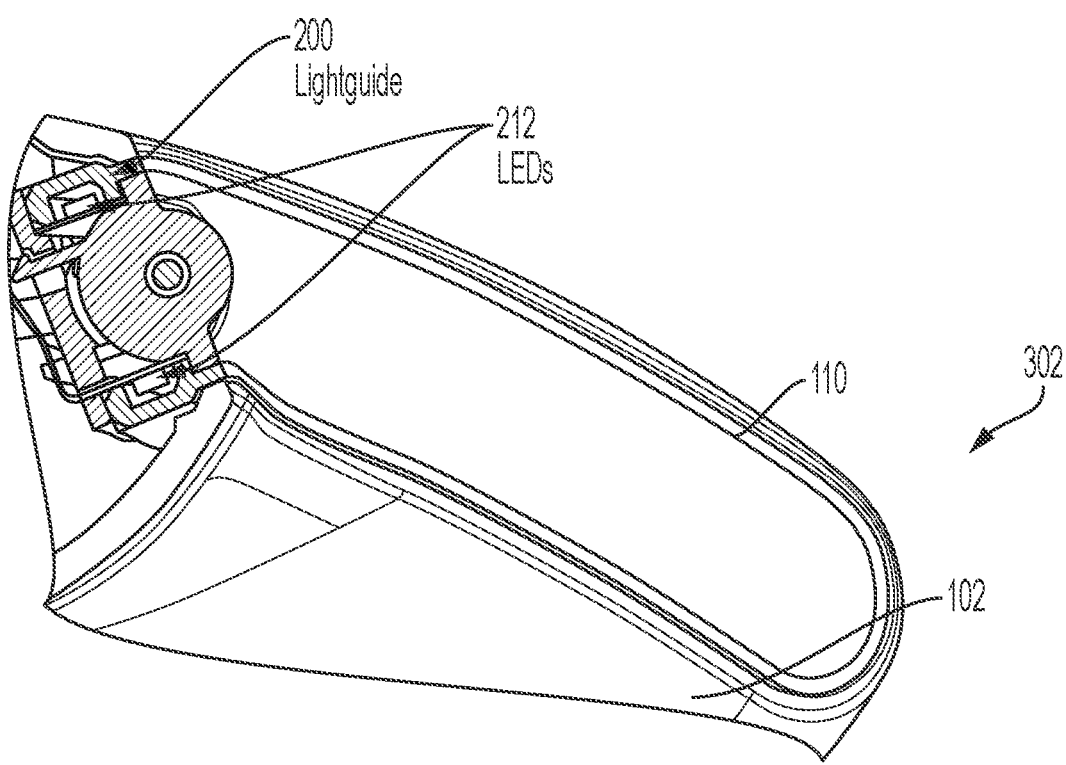
FIG. 3 is another cross-sectional view of a portion of a user input device with a back-firing lighting element according to some embodiments of the disclosure.

One embodiment for the embedding of a curved three-dimensional structure for emitting visible light from a user input device is shown in FIG. 3. FIG. 3 is another cross-sectional view of a portion of a user input device with a back-firing lighting element according to some embodiments of the disclosure. The casing 102 may have a lighting element 110 extending around a curved surface 302 and extend through two or more faces (or planes) of surfaces of the casing 102. LEDs 212 may be coupled to lightguides 200 to emit light from a visible part 110 of the lightguide 200. In some embodiments, the lightguide 200 is made from a transparent (e.g., light transmission >50%, >75%, >80%, >85%, >90%, or >95%) plastic (e.g., polycarbonate or acrylic) with dispersive fillers or a translucent plastic.

Figure 4:
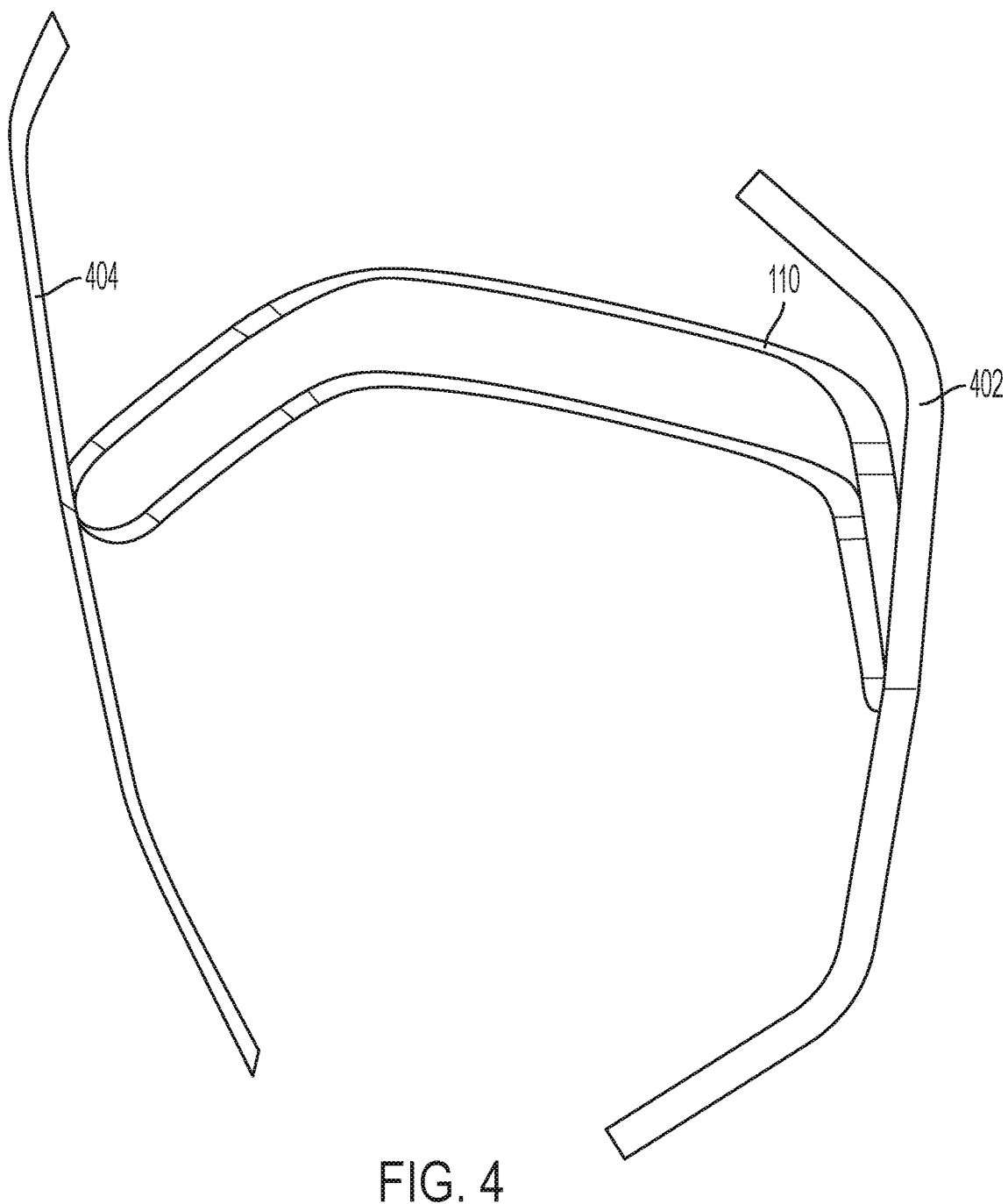
FIG. 4 is a perspective view illustrating the folding of two flexible printed circuits (FPCs) to form a lighting element for a user input device according to some embodiments of the disclosure.

To achieve the three-dimensional curved structure, two custom LED FPCs may be used by folding the FPCs from a two-dimensional shape to follow a three-dimensional curve. FIG. 4 is a perspective view illustrating the folding of two flexible printed circuits (FPCs) to form a lighting element for a user input device according to some embodiments of the disclosure. A first FPC 402 and a second FPC 404 are shown. Each of the FPCs 402 and 404 are two-dimensional structures. They may be folded toward each other during assembly for the user input device to form a lighting element 110. Each FPC 402 and 404 is bent in a single two-dimensional direction but results in a three-dimensional curve. Although two FPCs 402 and 404 are shown, more than two FPCs may be joined together to form the shape of the lighting element 110 or different shapes for lighting element 110. In some embodiments, the LEDs are equally spaced along the curve length. The two 2D FPCs 402 and 404 may be used to allow nesting during manufacturing, as opposed manufacturing a full circle or oval-shaped FPC, which may cause a large amount of waste during the panelized manufacturing process.

Figure 5:
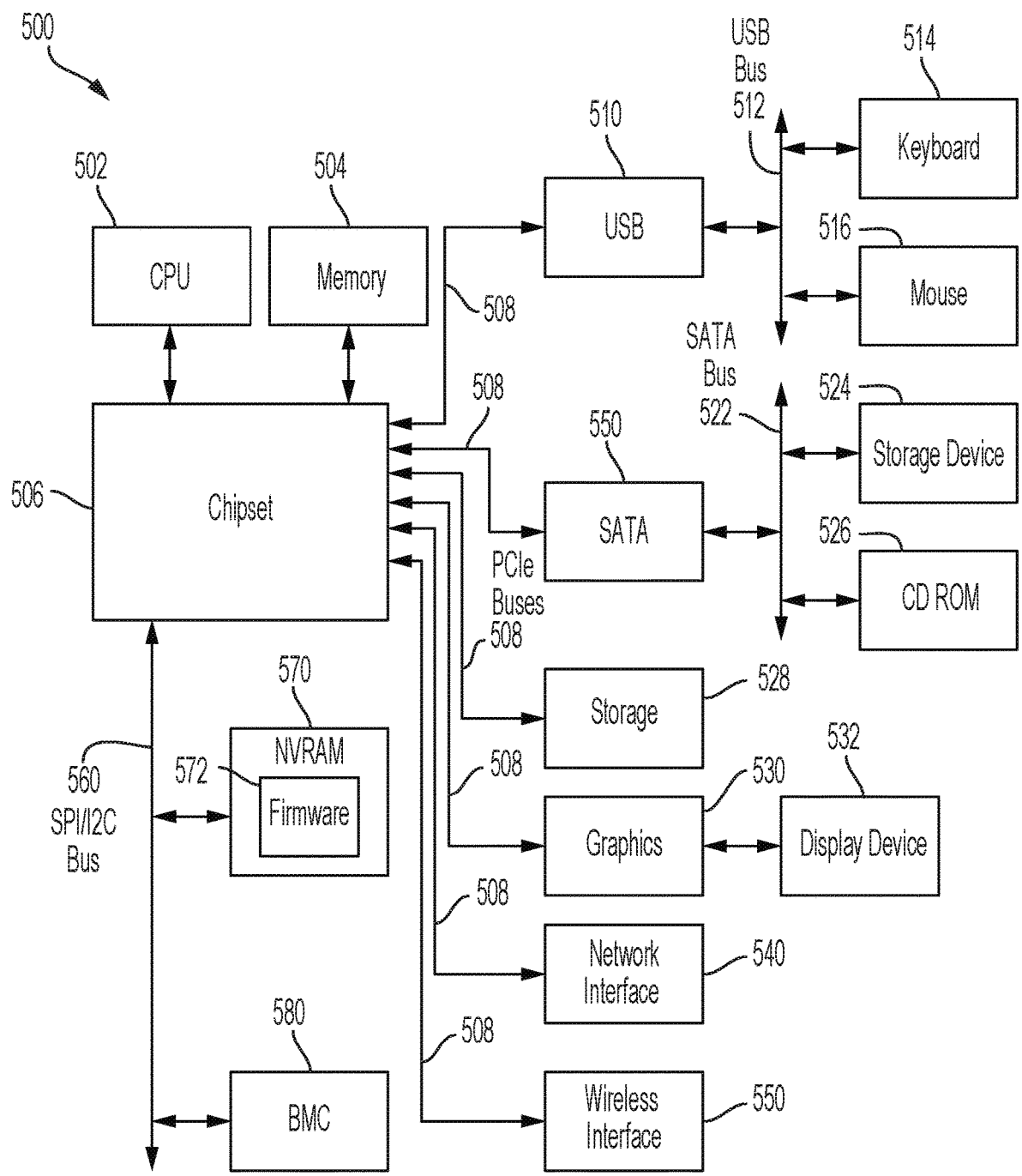
FIG. 5 is a schematic block diagram of an example information handling system according to some embodiments of the disclosure.

The user input device according to aspects of the disclosure described with reference to FIG. 1, FIG. 2, FIG. 3, and/or FIG. 4 may be used by a user to provide input to an information handling system, such as shown in FIG. 5. For example, the user input device may provide input to system 500 through USB bus 1412 or wireless interface 1450. In some embodiments, an information handling system, such as shown in FIG. 5, may be embedded in the user input device to form a portable electronic device.

FIG. 5 illustrates an example information handling system 500. Information handling system 500 may include a processor 502 (e.g., a central processing unit (CPU)), a memory (e.g., a dynamic random-access memory (DRAM)) 504, and a chipset 506. In some embodiments, one or more of the processor 502, the memory 504, and the chipset 506 may be included on a motherboard (also referred to as a mainboard), which is a printed circuit board (PCB) with embedded conductors organized as transmission lines between the processor 502, the memory 504, the chipset 506, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 502, the memory 504, the chipset 506, and/or other components may be organized as a System on Chip (SoC).

The processor 502 may execute program code by accessing instructions loaded into memory 504 from a storage device, executing the instructions to operate on data also loaded into memory 504 from a storage device, and generate output data that is stored back into memory 504 or sent to another component. The processor 502 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 502 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 506 may facilitate the transfer of data between the processor 502, the memory 504, and other components. In some embodiments, chipset 506 may include two or more integrated circuits (ICs), such as a northbridge controller coupled to the processor 502, the memory 504, and a southbridge controller, with the southbridge controller coupled to the other components such as USB 510, SATA 520, and PCIe buses 508. The chipset 506 may couple to other components through one or more PCIe buses 508.

Some components may be coupled to one bus line of the PCIe buses 508, whereas some components may be coupled to more than one bus line of the PCIe buses 508. One example component is a universal serial bus (USB) controller 510, which interfaces the chipset 506 to a USB bus 512. A USB bus 512 may couple input/output components such as a keyboard 514 and a mouse 516, but also other components such as USB flash drives, or another information handling system. Another example component is a SATA bus controller 520, which couples the chipset 506 to a SATA bus 522. The SATA bus 522 may facilitate efficient transfer of data between the chipset 506 and components coupled to the chipset 506 and a storage device 524 (e.g., a hard disk drive (HDD) or solid-state disk drive (SDD)) and/or a compact disc read-only memory (CD-ROM) 526. The PCIe bus 508 may also couple the chipset 506 directly to a storage device 528 (e.g., a solid-state disk drive (SDD)). A further example of an example component is a graphics device 530 (e.g., a graphics processing unit (GPU)) for generating output to a display device 532, a network interface controller (NIC) 540, and/or a wireless interface 550 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 506 may also be coupled to a serial peripheral interface (SPI) and/or Inter-Integrated Circuit (I2C) bus 560, which couples the chipset 506 to system management components. For example, a non-volatile random-access memory (NVRAM) 570 for storing firmware 572 may be coupled to the bus 560. As another example, a controller, such as a baseboard management controller (BMC) 580, may be coupled to the chipset 506 through the bus 560. BMC 580 may be referred to as a service processor or embedded controller (EC). Capabilities and functions provided by BMC 580 may vary considerably based on the type of information handling system. For example, the term baseboard management system may be used to describe an embedded processor included at a server, while an embedded controller may be found in a consumer-level device. As disclosed herein, BMC 580 represents a processing device different from processor 502, which provides various management functions for information handling system 500. For example, an embedded controller may be responsible for power management, cooling management, and the like. An embedded controller included at a data storage system may be referred to as a storage enclosure processor or a chassis processor.

System 500 may include additional processors that are configured to provide localized or specific control functions, such as a battery management controller. Bus 560 can include one or more busses, including a Serial Peripheral Interface (SPI) bus, an Inter-Integrated Circuit (I2C) bus, a system management bus (SMBUS), a power management bus (PMBUS), or the like. BMC 580 may be configured to provide out-of-band access to devices at information handling system 500. Out-of-band access in the context of the bus 560 may refer to operations performed prior to execution of firmware 572 by processor 502 to initialize operation of system 500.

Firmware 572 may include instructions executable by processor 102 to initialize and test the hardware components of system 500. For example, the instructions may cause the processor 502 to execute a power-on self-test (POST). The instructions may further cause the processor 502 to load a boot loader or an operating system (OS) from a mass storage device. Firmware 572 additionally may provide an abstraction layer for the hardware, such as a consistent way for application programs and operating systems to interact with the keyboard, display, and other input/output devices. When power is first applied to information handling system 500, the system may begin a sequence of initialization procedures, such as a boot procedure or a secure boot procedure. During the initialization sequence, also referred to as a boot sequence, components of system 500 may be configured and enabled for operation and device drivers may be installed. Device drivers may provide an interface through which other components of the system 500 can communicate with a corresponding device. The firmware 572 may include a basic input-output system (BIOS) and/or include a unified extensible firmware interface (UEFI). Firmware 572 may also include one or more firmware modules of the information handling system. Additionally, configuration settings for the firmware 572 and firmware of the information handling system 500 may be stored in the NVRAM 570. NVRAM 570 may, for example, be a non-volatile firmware memory of the information handling system 500 and may store a firmware memory map namespace 500 of the information handling system. NVRAM 570 may further store one or more container-specific firmware memory map namespaces for one or more containers concurrently executed by the information handling system.

Information handling system 500 may include additional components and additional busses, not shown for clarity. For example, system 500 may include multiple processor cores (either within processor 502 or separately coupled to the chipset 506 or through the PCIe buses 508), audio devices (such as may be coupled to the chipset 506 through one of the PCIe busses 508), or the like. While a particular arrangement of bus technologies and interconnections is illustrated for the purpose of example, one of skill will appreciate that the techniques disclosed herein are applicable to other system architectures. System 500 may include multiple processors and/or redundant bus controllers. In some embodiments, one or more components may be integrated together in an integrated circuit (IC), which is circuitry built on a common substrate. For example, portions of chipset 506 can be integrated within processor 502. Additional components of information handling system 500 may include one or more storage devices that may store machine-executable code, one or more communications ports for communicating with external devices, and various input and output (I/O) devices, such as a keyboard, a mouse, and a video display.

In some embodiments, processor 502 may include multiple processors, such as multiple processing cores for parallel processing by the information handling system 500. For example, the information handling system 500 may include a server comprising multiple processors for parallel processing. In some embodiments, the information handling system 500 may support virtual machine (VM) operation, with multiple virtualized instances of one or more operating systems executed in parallel by the information handling system 500. For example, resources, such as processors or processing cores of the information handling system may be assigned to multiple containerized instances of one or more operating systems of the information handling system 500 executed in parallel. A container may, for example, be a virtual machine executed by the information handling system 500 for execution of an instance of an operating system by the information handling system 500. Thus, for example, multiple users may remotely connect to the information handling system 500, such as in a cloud computing configuration, to utilize resources of the information handling system 500, such as memory, processors, and other hardware, firmware, and software capabilities of the information handling system 500. Parallel execution of multiple containers by the information handling system 500 may allow the information handling system 500 to execute tasks for multiple users in parallel secure virtual environments.

Any schematic or flow chart diagrams, or descriptions of methods, are generally set forth as a logical flow chart. As such, the described order and labeled steps are indicative of aspects of the disclosed method. Other steps and methods may be conceived that are equivalent in function, logic, or effect to one or more steps, or portions thereof, of the illustrated method. Additionally, the order in which a particular method occurs may or may not strictly adhere to the order of the corresponding steps shown.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus, comprising:
    a case enclosing a space for user input device components;
    a lightguide comprising a first surface exposed through the case and a second surface concealed inside the case, wherein the first surface of the lightguide is a three-dimensional curved light shape that extends through two or more planar faces of the case; and
    a lighting device within the case configured to emit light towards the second surface of the lightguide for output through the first surface.

2. The apparatus of claim 1, wherein the lightguide is configured such that there is no direct path for light from the lighting device to exit through the first surface.

3. The apparatus of claim 1, wherein the lighting device is configured to emit light toward the second surface in a direction facing into the case.

4. The apparatus of claim 1, wherein the lightguide is configured to partially surround the lighting device.

5. The apparatus of claim 1, wherein the lighting device comprises a light emitting diode (LED).

6. The apparatus of claim 1, wherein the lightguide comprises a mask on at least one surface, the mask configured to prevent direct emission of light from the lighting device through the first surface.

7. The apparatus of claim 6, wherein the mask comprises a light blocking paint.

8. The apparatus of claim 1, wherein the lightguide comprises a third surface opposite the second surface, wherein the third surface comprises a reflective surface configured for reflecting the light emitted into the second surface toward the first surface.

9. The apparatus of claim 8, wherein the third surface comprises a reflective paint.

10. The apparatus of claim 1, further comprising additional lighting devices configured to emit light into the lightguide to display light to a user in a shape of the first surface of the lightguide.

11. The apparatus of claim 10, further comprising a controller coupled to the lighting device and the additional lighting devices and configured to individually address colors of the lighting device and the additional lighting devices.

12. The apparatus of claim 1, wherein the lightguide comprises at least two two-dimensional flexible printed circuits attached to each other to form the three-dimensional curved light shape of the first surface of the lightguide.

13. The apparatus of claim 1, wherein the lightguide comprises a dispersive media.

14. The apparatus of claim 2, wherein the light is emitted from the lighting device in a direction opposite to a direction in which the light exits through the first surface.

15. A method, comprising:
    bending a first flexible printed circuit to form a first portion of a three-dimensional light shape that extends through two or more planar faces of a casing of a user input device, wherein the first portion comprises:
        a lightguide comprising a first surface exposed through the casing and a second surface concealed inside the casing, and
        a lighting device configured to emit light into the second surface of the lightguide for output through the first surface;
    bending a second flexible printed circuit to form a second portion of the three-dimensional light shape; and
    attaching the first portion to the second portion to complete the three-dimensional light shape.

16. The method of claim 14, wherein the first portion comprises a first plurality of lighting devices and the second portion comprises a second plurality of lighting devices, and wherein attaching the first portion to the second portion forms an approximately equal-spaced lighting along the three-dimensional light shape using the first plurality of lighting devices and the second plurality of lighting devices.

17. A game controller for an information handling system, comprising:
    a case enclosing a space for user input device components;
    a lightguide comprising a first surface exposed through the case and a second surface concealed inside the case, wherein the first surface of the lightguide is a three-dimensional curved light shape that extends through two or more planar faces of the case; and
    a plurality of lighting devices within the case configured to emit light towards the second surface of the lightguide for output through the first surface.

18. The game controller of claim 17, wherein the lightguide is configured such that there is no direct path for light from the plurality of lighting devices to exit through the first surface.

19. The game controller of claim 17, wherein the lighting devices comprises a light emitting diodes (LEDs).

20. The game controller of claim 17, further comprising a controller coupled to the plurality of lighting devices and configured to individually address colors of each lighting device of the plurality of lighting devices.

\* \* \* \* \*